(12) United States Patent
Pompey

(10) Patent No.: US 8,460,005 B1
(45) Date of Patent: Jun. 11, 2013

(54) KIT FOR BUILDING A MODEL OF A CELL

(76) Inventor: Audrey-Sioux Pompey, Mt. Dora, FL (US)

(*) Notice: Subject to any disclaimer, the term of this patent is extended or adjusted under 35 U.S.C. 154(b) by 205 days.

(21) Appl. No.: 13/024,632

(22) Filed: Feb. 10, 2011

(51) Int. Cl.
*G09B 23/00* (2006.01)

(52) U.S. Cl.
USPC .......................................... 434/295

(58) Field of Classification Search
USPC ............... 434/81, 82, 84, 127, 276, 278, 295, 434/365; 446/70, 85, 490, 491
See application file for complete search history.

(56) References Cited

U.S. PATENT DOCUMENTS

| | | | |
|---|---|---|---|
| 4,496,324 A | 1/1985 | Schulz | |
| 5,871,361 A | 2/1999 | Gastle et al. | |
| 5,934,969 A | 8/1999 | Rehkemper et al. | |
| 5,944,532 A | 8/1999 | Lienhop | |
| 6,007,343 A | 12/1999 | O'Brien | |
| 6,280,199 B1 | 8/2001 | Baker | |
| D537,881 S | 3/2007 | Kotani et al. | |
| 7,651,333 B2 * | 1/2010 | Tamarkin | 434/295 |
| 7,927,103 B1 * | 4/2011 | Regan | 434/188 |
| 7,959,442 B2 * | 6/2011 | Nichols | 434/127 |
| 8,133,056 B2 * | 3/2012 | Olsen et al. | 434/160 |
| 8,152,528 B2 * | 4/2012 | Alm et al. | 434/127 |
| 8,277,225 B2 * | 10/2012 | Atchison | 434/267 |
| 2007/0292830 A1 * | 12/2007 | Ribeiro et al. | 434/295 |

OTHER PUBLICATIONS

"My Treasures: Year 10 Biology Project", Oct. 2008 [retrieved online Nov. 29, 2012].*

* cited by examiner

*Primary Examiner* — Kurt Fernstrom

(57) ABSTRACT

A method of creating a model of a biological cell. The method features providing a circular base with indentations disposed therein, forming a cell membrane and at least one organelle from a mixture formed by mixing all-purpose flour and water. Organelles may include a nuclear membrane, a cell wall, mitochondria, a smooth endoplasmic reticulum (ER), a rough ER, a vacuole, a golgi apparatus, a nucleolus, a nucleoplasm, chromatin, a ribosome, DNA, RNA, transcription machinery, a histone, and a microtubule. The outside edge of the base is lined with the cell membrane. The organelles are inserted into indentations or atop the base. The organelles can be secured with glue.

5 Claims, 4 Drawing Sheets

KIT FOR BUILDING A MODEL OF A CELL

FIELD OF THE INVENTION

The present invention is directed to an educational tool, more particularly to a kit comprising a plurality of items used to design a model of a biological cell.

BACKGROUND OF THE INVENTION

Learning biology, for example cell structure and cell organelles, can be very difficult for students. The present invention features a kit for building a model of a cell. The kit of the present invention can be used to help educate individuals about biology, for example the organelles and components of a cell.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a kit for creating a model of a biological cell. In some embodiments, the kit comprises a base with indentations disposed therein, all-purpose flour; salt; water; food coloring, glitter, paint, beads, glue, and a set of forceps. In some embodiments, the kit further comprises spray glitter. In some embodiments, the kit further comprises an instruction card with a set of instructions.

The present invention also features a method of creating a model of a biological cell. The method may comprise providing a kit comprising (i) a generally circular base having an outer edge and a top surface, wherein indentations are disposed in the top surface of the base; and (ii) all-purpose flour; water; and glue; forming a cell membrane and at least one organelle from a mixture formed by mixing the all-purpose flour and the water, said organelles including a nuclear membrane, a cell wall, mitochondria, a smooth endoplasmic reticulum (ER), a rough ER, a vacuole, a golgi apparatus, a nucleolus, a nucleoplasm, chromatin, a ribosome, DNA, RNA, transcription machinery, a histone, and a microtubule; lining the outside edge of the base with the cell membrane and either inserting an organelle into an indentation in the base or placing an organelle on the top surface of the base; and securing the cell membrane and organelle with the glue.

In some embodiments, the cell membrane or the organelle is formed from a mixture made by mixing the all-purpose flour, the water, and salt. In some embodiments, the kit further comprises one or more of the following components: food coloring, glitter, paint, beads, a set of forceps. In some embodiments, the method further comprises decorating the model of the biological cell with paint, glitter, food coloring, or a combination thereof. In some embodiments, the cell membrane or the organelle is formed from a mixture made by mixing the all-purpose flour, the water, salt, and either paint, glitter, food coloring, or a combination thereof.

DESCRIPTION OF PREFERRED EMBODIMENTS

Figure 1:
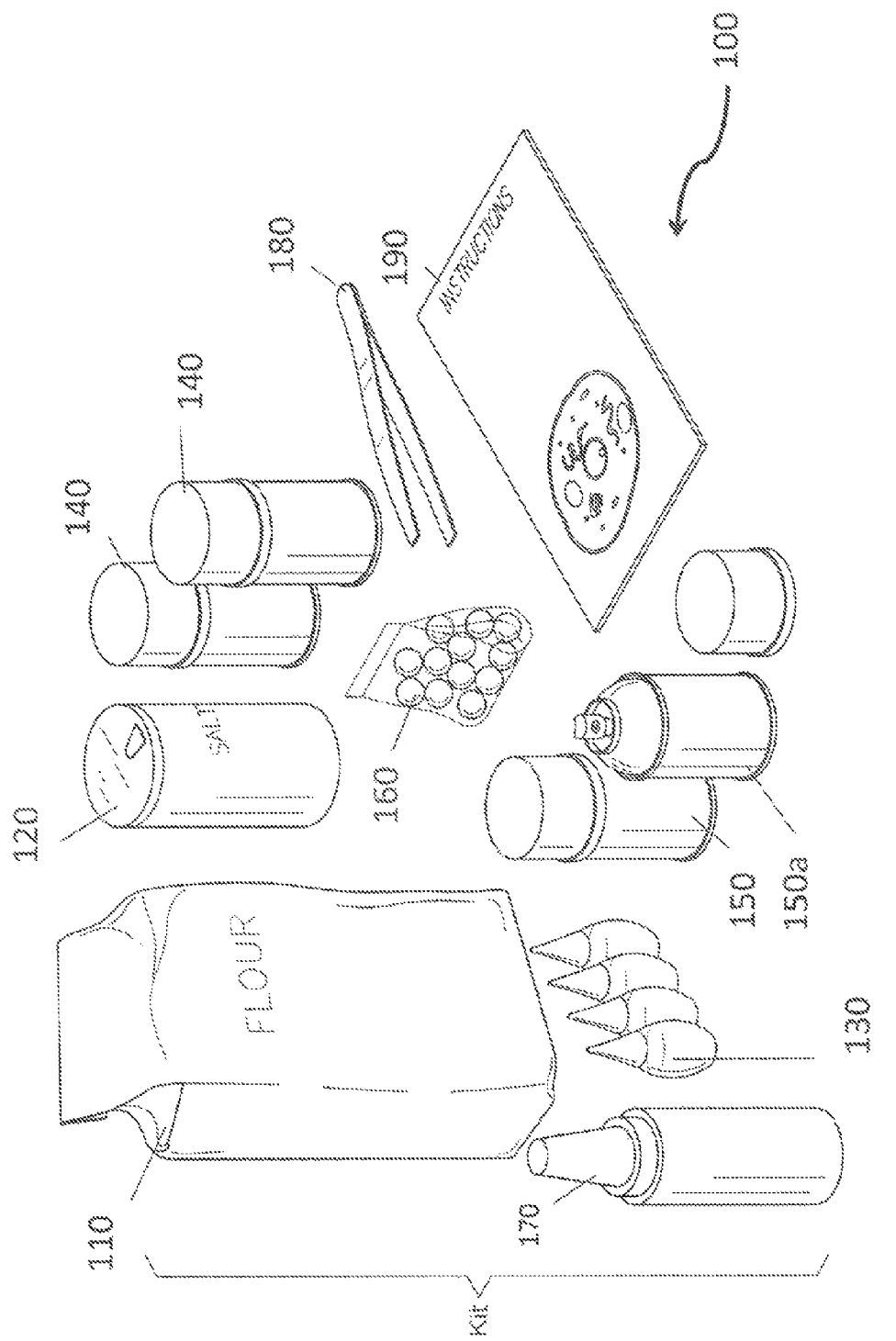
FIG. 1 is a first perspective view of components of the kit of the present invention.
Figure 2:
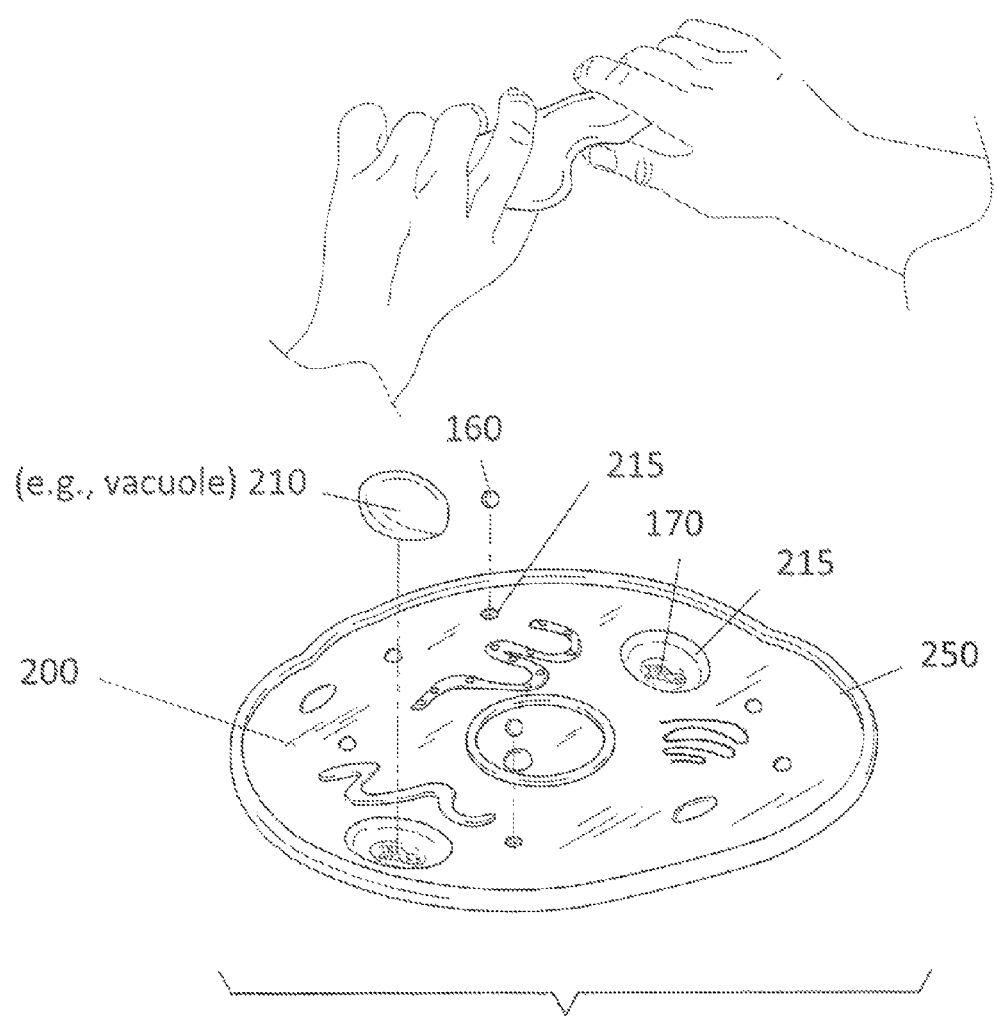
FIG. 2 is a second perspective view of the kit of the present invention being used to create a model of a cell.
Figure 3:
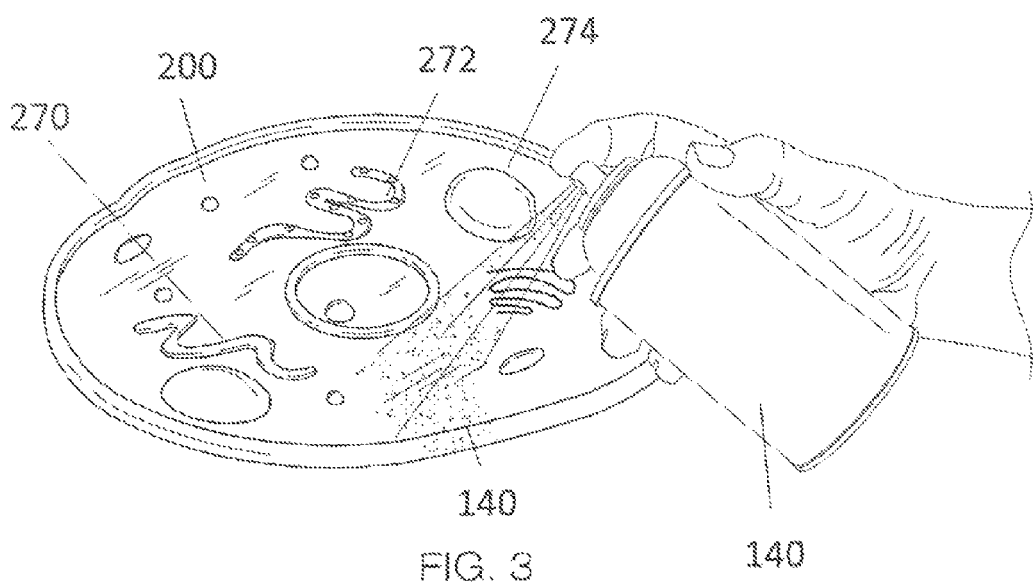
FIG. 3 is a third perspective view of the kit of the present invention being used to create a model of a cell.
Figure 4:
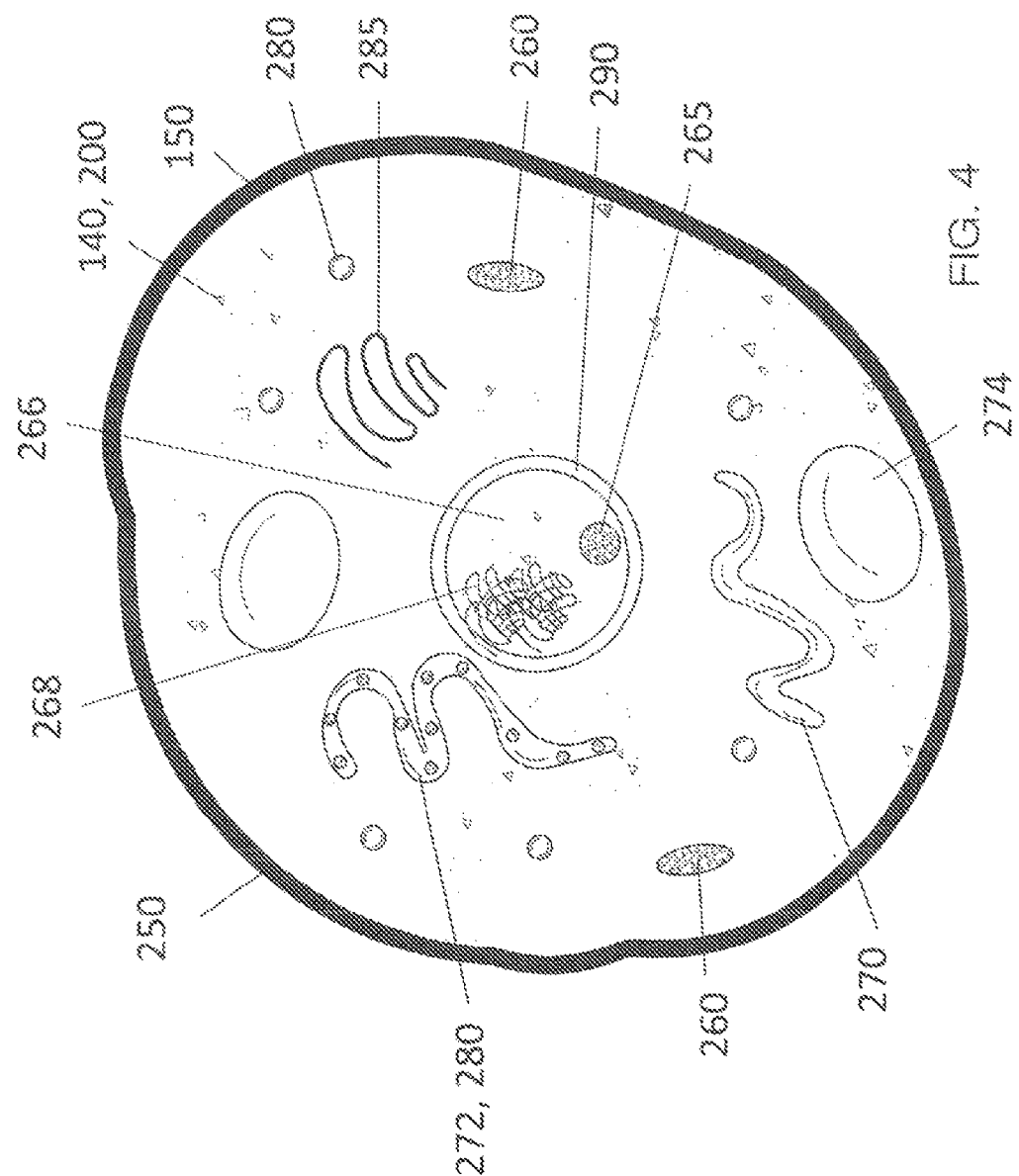
FIG. 4 is a top view of a model of a cell.

Referring now to FIG. 1-4, the present invention features a kit 100 for building a model of a cell. The kit 100 of the present invention can be used to help educate individuals about biology, for example the organelles and components of a cell.

The kit 100 of the present invention comprises flour 110 (e.g., all purpose flour), salt 120, water, food coloring 130, glitter 140 (e.g., gold glitter, silver glitter, etc.), paint 150, spray glitter 150a, beads 160, glue 170, and a set of forceps 180 (e.g., flat, painted). In some embodiments, the kit 100 further comprises an instruction card 190 with a set of instructions.

The present invention also features a method of constructing a model of a biological cell. For example, the kit 100 can be used to create a model of a cell including one or more organelles 210 and/or other cell structures and/or cell components. For example, the model may comprise a cell membrane 250, a cell wall, mitochondria 260, smooth endoplasmic reticulum (ER) 270, rough ER 272, vacuoles 274, golgi apparatus 285, nuclear membrane 290, a nucleolus 265, nucleoplasm 266, chromatin 268, ribosomes 280, DNA, RNA, transcription machinery (e.g., polymerases, transcription factors), histones, cytoskeletal components (e.g., microtubules), the like, or a combination thereof.

A user can begin with a base 200 (e.g., generally circular base). The base 200 may represent the cytoplasm. One or more indentations 215 may be disposed in the base 200. The indentations 215 may help to position various materials on the base 200 for organelles 210 (e.g., vacuole, etc., as described above) and/or other cell structures and components. The user can create organelles and/or cell structures and/or cell components with the kit 100 (e.g., according to instructions). For example, the user can paint with paint, glitter, and the like. The model can later be used for teaching purposes.

The organelles 210 and other components may be constructed using the flour (e.g., flour and water). Other components may be included in the mixture to make the organelles, for example the food coloring, glitter, etc. The mixture can be shaped to resemble the organelle of interest. When using glue, glue can be sprayed as close to the edge of the cell membrane as possible. This can help prevent the edges of the base 200 from curling.

The following the disclosures of the following U.S. Patents are incorporated in their entirety by reference herein: U.S. Pat. No. 6,280,199; U.S. Pat. No. 6,007,343; U.S. Pat. No. 5,944,532; U.S. Pat. No. 5,934,969; U.S. Pat. No. 5,871,361; U.S. Pat. No. 4,496,324; U.S. Design Pat. No, D537,881.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A method of creating a model of a biological cell, said method comprising:
   (a) providing a kit comprising (i) a generally circular base having an outer edge and a top surface, wherein indentations are disposed in the top surface of the base; and (ii) all-purpose flour; water; and glue;
   (b) forming a cell membrane and at least one organelle from a mixture formed by mixing the all-purpose flour and the water, said organelles including a nuclear membrane, a cell wall, mitochondria, a smooth endoplasmic reticulum (ER), a rough ER, a vacuole, a golgi apparatus, a nucleolus, a nucleoplasm, chromatin, ribosome, DNA, RNA, transcription machinery, a histone, and a microtubule;
   (c) lining the outside edge of the base with the cell membrane and either inserting an organelle into an indentation in the base or placing an organelle on the top surface of the base; and
   (d) securing the cell membrane and organelle with the glue.

2. The method of claim 1, wherein the cell membrane or the organelle is formed from a mixture made by mixing the all-purpose flour, the water, and salt.

3. The method of claim 1, wherein the kit further comprises one or more of the following components: food coloring, glitter, paint, beads, a set of forceps.

4. The method of claim 1 further comprising decorating the model of the biological cell with paint, glitter, food coloring, or a combination thereof.

5. The method of claim 1, wherein the cell membrane or the organelle is formed from a mixture made by mixing the all-purpose flour, the water, salt, and either paint, glitter, food coloring, or a combination thereof.

* * * * *